United States Patent [19]

Orr

[11] Patent Number: 4,954,828
[45] Date of Patent: Sep. 4, 1990

[54] LONG RANGE POLICE RADAR WARNING RECEIVER

[75] Inventor: Steven K. Orr, Loveland, Ohio

[73] Assignee: Cincinnati Microwave, Inc., Cincinnati, Ohio

[21] Appl. No.: 481,509

[22] Filed: Feb. 20, 1990

Related U.S. Application Data

[63] Continuation-in-part of Ser. No. 421,525, Oct. 13, 1989.

[51] Int. Cl.[5] .................. G01S 7/40; H04B 17/00
[52] U.S. Cl. .................................... 342/20; 455/226; 455/228; 455/315
[58] Field of Search ................. 342/20; 455/226, 228, 455/315

[56] References Cited

U.S. PATENT DOCUMENTS

| | | | |
|---|---|---|---|
| 3,303,335 | 2/1967 | Pryor | 364/572 |
| 3,344,349 | 9/1967 | Schroeder | 324/77 H |
| 3,399,404 | 8/1968 | Githens et al. | 342/90 |
| 3,514,585 | 5/1970 | Norsworthy | 364/604 |
| 3,573,446 | 4/1971 | Bergland | 364/726 |
| 3,622,765 | 11/1971 | Anderson | 364/575 |
| 3,646,334 | 2/1972 | Wold | 364/728.03 |
| 3,778,606 | 12/1973 | Schmitt et al. | 364/726 |
| 3,829,670 | 8/1974 | Kebabian | 364/724.1 |
| 3,925,732 | 12/1975 | Tanaka et al. | 375/94 |
| 3,997,770 | 12/1976 | Claasen et al. | 364/728.03 |
| 3,997,773 | 12/1976 | Van Essen et al. | 364/723 |
| 4,022,332 | 4/1977 | Crochiere et al. | 414/788.5 |
| 4,074,264 | 2/1978 | Wilmonti | 342/90 |
| 4,075,703 | 2/1978 | Dillard | 342/90 |
| 4,099,075 | 7/1978 | Goldberg et al. | 307/352 |
| 4,209,843 | 6/1980 | Hyatt | 364/728.03 |
| 4,255,791 | 3/1981 | Martin | 364/514 |
| 4,313,216 | 1/1982 | Jaeger et al. | 455/226 |
| 4,317,092 | 2/1982 | Potter | 333/165 |
| 4,386,353 | 5/1983 | Bleijerveld et al. | 342/91 |
| 4,472,785 | 9/1984 | Kasuga | 364/718 |
| 4,553,221 | 11/1985 | Hyatt | 364/724.05 |
| 4,581,769 | 4/1986 | Grimsley et al. | 455/226 |
| 4,626,857 | 12/1986 | Imazeki | 342/20 |
| 4,630,054 | 12/1986 | Martinson | 342/20 |
| 4,668,952 | 5/1987 | Imazeki et al. | 342/20 |
| 4,723,125 | 2/1988 | Elleaume | 342/194 |
| 4,750,215 | 6/1988 | Biggs | 455/226 |
| 4,772,889 | 9/1988 | Elleaume | 342/194 |
| 4,780,720 | 10/1988 | Watts | 342/91 |
| 4,811,263 | 3/1989 | Hedley et al. | 364/724.13 |
| 4,811,362 | 3/1989 | Yester, Jr. et al. | 375/75 |
| 4,862,175 | 8/1989 | Biggs et al. | 342/20 |

FOREIGN PATENT DOCUMENTS 2732643  1/1979  Fed. Rep. of Germany.

OTHER PUBLICATIONS

Cooley, J. W. and Tukey, J. W.; *An Algorithm for the Machine Calculation of Complex Fourier Series;* Reprinted from *Mathematics of Computation;* vol. 19; No. 90; pp. 297–301; 1965.
Weinsatein, Clifford J.; *Short–Time Fourier Analysis and Its Inverse;* S. B., Mass. Institute of Tech.; pp. 2–3, 86–96; 1966.
Halberstein; *Recursive, Complex Fourier Analysis for Real–Time Applications;* Proc. of the IEEE; p. 903; Jun. 1966.
Welch, P. D.; *The Use of Fast Fourier Transform for the estimation of Power Spectra: A Method Based on Time Averaging Over Short, Modified Periodograms;* Reprinted from IEEE Trans. Audio Electroacoust; vol. AU–15; pp. 70–73; Jun. 1967.
Dillard, G. M.; *Recursive Computation of the Discrete Fourier Transform with Applications to an FSK Communication Receiver;* Naval Electronics Laboratory Center.
Webb, R. C.; *IF Signal Sampling Improves Receiver Detection Accuracy;* Microwaves & RF; pp. 99–103; Mar. 1989.

*Primary Examiner*—Thomas H. Tarcza
*Assistant Examiner*—John B. Sotomayor
*Attorney, Agent, or Firm*—Wood, Herron & Evans

[57] ABSTRACT

A police radar warning receiver is disclosed including a DSP circuit having a correlator and a peak detector to provide after each sweep of a swept local oscillator a dynamic threshold for that sweep as affected by all prior sweeps and against which information from that sweep is evaluated to determine whether to generate an alarm enable indicative of receipt of a police radar signal.

20 Claims, 1 Drawing Sheet

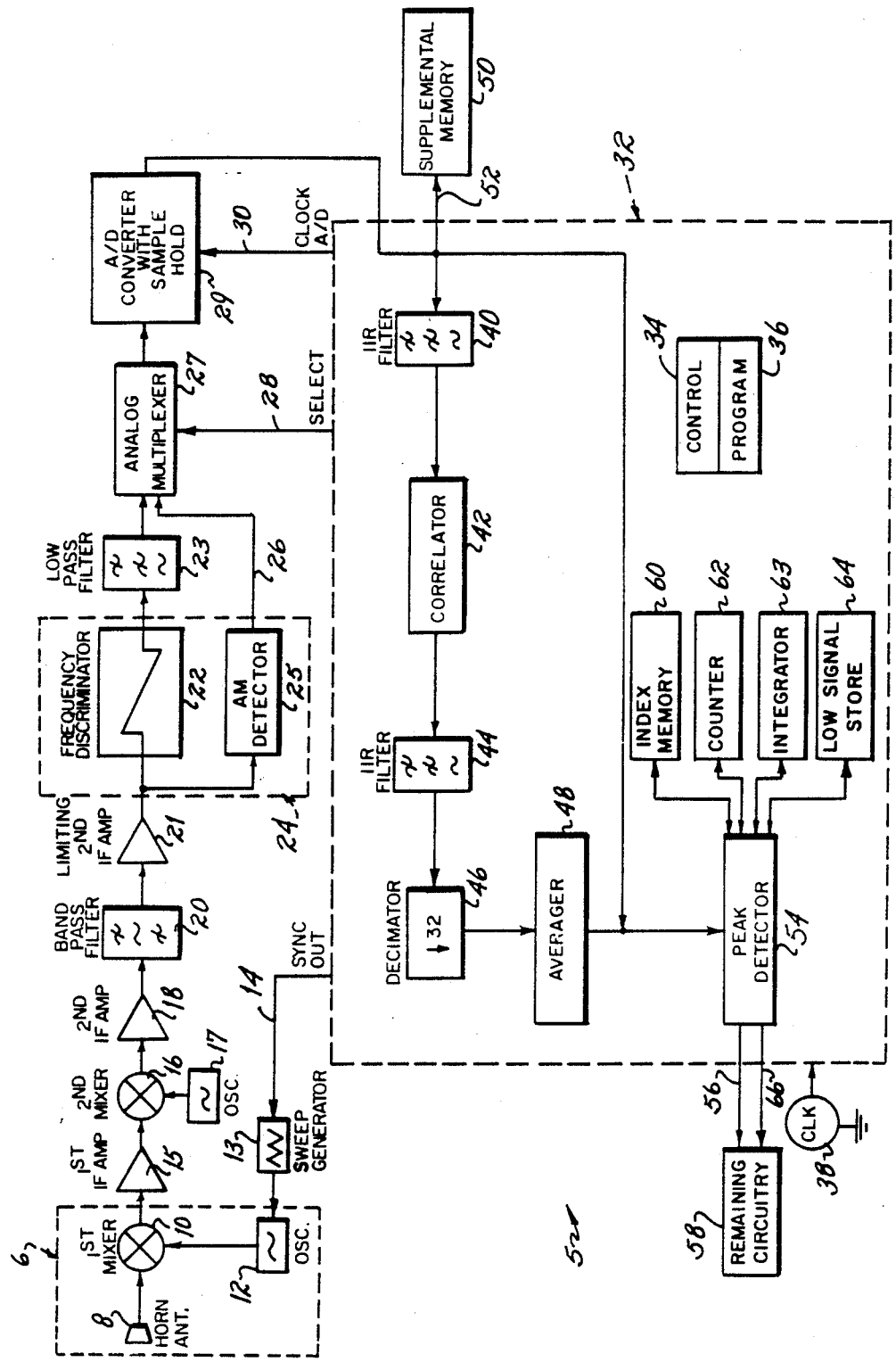

LONG RANGE POLICE RADAR WARNING RECEIVER

RELATED APPLICATION

This application is a continuation-in-part of my copending application Ser. No. 07/421,525, filed Oct. 13, 1989, entitled Long Range Police Radar Warning Receiver.

BACKGROUND OF THE INVENTION

I. Field of the Invention

The present invention is directed to an improvement in vehicle-mounted police radar warning receivers, and more particularly to such receivers which detect police radar signals before the vehicle is within the detection range of the police radar unit.

II. Description of the Prior Art

Police radar generally operates in the X-band and K-band of the frequency spectrum as discussed in U.S. Pat. No. 4,313,216, assigned to Cincinnati Microwave, Inc., the assignee herein. There are, generally, two types of police radar. One emits a continuous radar signal so long as the radar unit is turned on. The other emits a brief burst of radar signal when the police officer triggers the unit. This latter type is referred to as pulsed or instant-on radar. While transmitting, both continuous and pulsed radar transmit a signal which is at a fixed frequency within the selected band.

An electronic assembly referred to as a police radar warning receiver has been devised to detect the presence of police radar signals. The receiver is mountable in a vehicle, such as a passenger car or truck, motorcycle, boat or the like, which travels on land or water in areas subject to speed-monitoring radar surveillance by police, and functions to detect the presence of the police radar and provide the driver or user with an audible and/or visual indication that his speed is being checked by radar. The receiver is contained in a box-like housing which is set on the dash or clipped to the visor in the vehicle. Extending from the rear of the housing may be a power cord which terminates in a plug adapted to be received in the cigarette lighter socket of the vehicle. The front panel of the receiver faces the driver and has various indicators and control knobs.

When police radar is operating within range of the radar warning receiver, the circuitry of the receiver is able to detect the presence thereof. The ESCORT and PASSPORT radar warning receivers, manufactured by the assignee herein, Cincinnati Microwave, Inc. of Cincinnati, Ohio utilize a superheterodyne circuit for this purpose. As explained in aforementioned U.S. Pat. No. 4,313,216, and in U.S. Pat. Nos. 4,581,769 and 4,750,215, which are also assigned to the assignee herein, a superheterodyne circuit employs two local oscillators, one of which sweeps in frequency over a range of frequencies related to one or both radar bands. To this end, a first local oscillator signal is mixed with the incoming police radar or other signal to produce a first IF signal. The first IF signal is then mixed with the second local oscillator signal to produce a second IF signal. Due to the sweep of one of the local oscillators, the second IF signal presents a sweep pattern which extends over a band corresponding to the X and K bands and including noise and signals, the latter at locations in the sweep pattern corresponding to the frequency of received signals in the X and/or K bands.

The sweep pattern of the second IF signal is then passed through an FM discriminator circuit. The FM discriminator provides a second sweep pattern output including S-curves having positive- and negative-going portions to define time-related positions relative the start of the sweep corresponding to the frequency at which an incoming signal is received. As is understood, such a heterodyning process will result in generation of a "duplicate" or image of the police radar signal within the receiver. Hence, the discriminator generates one S-curve related to the actual frequency signal received as well as a second S-curve related to the image frequency of the received signal. One or both of these S-curves may then be utilized to indicate reception of a police radar signal so as to alert an operator to the presence of police radar surveillance as described in aforementioned U.S. Pat. Nos. 4,581,769 and 4,750,215, and U.S. Pat. No. 4,862,175, also assigned to the assignee hereof.

The ability of radar warning receivers to detect police radar signals, however, is limited primarily by the sensitivity of the receiver electronic circuitry which defines a capture range. That is, signals emitted by police radar units may travel a substantial distance from the unit. As is well understood, the police radar signal must travel to the vehicle under surveillance and then return altered by a Doppler shift representing speed of the vehicle. However, as the police radar signal travels to and from the vehicle under surveillance, the weaker the signal becomes. Thus, the further the vehicle under surveillance is from the police radar unit, the weaker the return radar signal is such that at some distance and beyond, the police radar signal is too weak to return to the police radar unit and be evaluated for speed of the vehicle (detection range).

It is desirable that the radar warning receiver detect the police radar signal while it is still so weak as to be beyond the detection range of the police radar unit. However, as with the police radar unit, the further the police radar warning receiver is from the source of the police radar signal, the weaker the signal. At some distance from the police radar unit corresponding to the capture range of the police radar warning receiver, the police radar signal may be so weak that the police radar warning receiver is unable to distinguish signal from noise, meaning that a police radar signal will not be detected until the vehicle moves closer to the police radar unit. The difference in distance between the detection range of the police radar unit and the capture range of the police radar warning receiver defines a reaction zone during which the vehicle operator must react to the presence of a police radar signal. It is desirable that the reaction zone be as large as possible so that the operator of the vehicle under surveillance will have sufficient time to react before the vehicle comes within the detection range of the police radar unit.

Additionally, some police radar units are of the "instant-on" type meaning that they may be used in a manner to intermittently emit only short bursts of police radar signals. Where the bursts are given only infrequently, the first burst may be given when the police radar warning receiver is too far away to detect that burst, i.e., at that distance, the signal from the police radar unit is below the threshold of the receiver. The second burst may come after the vehicle is within the detection range of the police radar unit. Under such circumstances, the operator will have had no advance warning that the vehicle is under surveillance. Accordingly, it is desirable to extend the capture range of the police radar warning by providing the receiver with as much sensitivity, i.e., as low a threshold, as possible so that police radar signals may be received as far from the police radar unit's detection range as possible.

Typical of current radar warning receivers is that their sensitivity is generally low enough to be able to detect most police radar signals somewhat beyond the detection range of the associated police radar unit and, thus, provide a reaction zone. However, greater improvement is desired. One approach could be simply to select a lower threshold above which all signals are accepted as valid, thus extending the capture range. However, this approach may allow too much random noise to pass through the receiver circuitry and appear as police radar signals resulting in irritating and misleading false alarms. Another approach has been to continuously vary the threshold based on the level of random noise as a sweep of the local oscillator progresses. However, in such an approach, the threshold may be varied part way through the sweep but before a weak police radar signal is about to be received. Thus, if the threshold were caused to increase as the sweep progressed, the vehicle may be too far away to detect a weak police radar signal. As any signal not above the threshold is discarded, a police radar signal may be missed. Thus, rather than increase the range of the receiver, such an approach may actually reduce the capture range capabilities thereof, because the sensitivity of a receiver with such a varying threshold may be effectively, but undesirably, reduced. Alternately, the threshold may be caused to decrease to such a level that noise may lead to undue false alarms.

SUMMARY OF THE INVENTION

The present invention provides circuitry for a radar warning receiver which increases the available reaction zone without some of the drawbacks of threshold adjustment approaches of the prior art.

In its broadest sense, a radar warning receiver according to the present invention utilizes a digital correlator coupled to the FM discriminator output to process the sweep pattern provided by the FM discriminator and a peak detector to evaluate the processed sweep pattern based upon a cumulative history of processed sweep patterns. The result is to generate a threshold level unique to the information content level of signals received over a plurality of sweeps whereby to adjust the sensitivity of the police radar warning receiver for maximum capture range under the circumstances. In this way, the capture range is improved over prior art police radar warning receivers while reducing the risk of missing a weak signal or causing undue false alarms which may result from continuously varying the threshold during a sweep.

To this end, and in accordance with the principles of the present invention, during each sweep of the local oscillator, the FM discriminator output is digitally sampled at successive sample intervals to generate a series of digital sample words representative of the sweep pattern produced by the FM discriminator. Thus, the magnitude of each digital sample word corresponds to the magnitude of signals and noise received at the X- and/or K-band frequencies to which the receiver is tuned at the time the sample is obtained. As each sample word is generated, it is manipulated in the digital correlator by correlating each digital sample word and several of its predecessors in that sweep with a complex correlation function representative of the FM discriminator response to produce a series of complex digital correlator words having improved signal-to-noise ratio as compared to the sample words. The complex digital correlator words so produced are coupled to an averager which separately accumulates and averages for each sample interval or group of intervals the complex digital correlator word(s) generated in the same sample interval(s) over a plurality of sweeps of the local oscillator. The series of complex averager words thus obtained are converted to magnitude and represent the RF signal energy received in each of the sample intervals of the sweep. Averaging reduces the influence of noise received during that sample interval to thereby increase sensitivity of the receiver. After each sweep, a peak detector calculates the mean square value of the series of the complex digital averager words whereby to provide a dynamic threshold for that sweep as affected by all of the previous sweeps. Also, after each sweep, the digital averager words thus obtained are examined by the peak detector against the current dynamic threshold whereby any averager word larger than the dynamic threshold is indicative of receipt of a police radar signal in that sample interval. A sweep-to-sweep comparison of averager words exceeding the threshold in each sweep is preferred to reduce false alarms from varying signal sources, such as superhomodyne radar warning receivers operating in the vicinity. In a preferred embodiment, each complex averager word determined as the sweep progresses is immediately utilized to determine the energy magnitude for the associated sample interval whereby to produce a series of averager magnitude words. After the sweep, the series of averager magnitude words thus obtained are utilized to determine the dynamic threshold against which the averager magnitude words are examined by the peak detector.

While the foregoing is believed generally to provide improved sensitivity over prior radar warning receivers, the response time of the receiver to relatively strong signals may be adversely affected by the averaging process. To this end, after each sample interval, the complex averager word is still determined. But, before the averager magnitude word is determined therefrom, a test of the magnitude of the underlying complex correlator word is made against a minimum threshold. If that sample interval's correlator word magnitude does not exceed the minimum threshold, the averager magnitude word is determined as before described. If, however, that sample interval's correlator word magnitude exceeds the minimum threshold, the correlator word magnitude is substituted for the averager magnitude word. Thereafter, the dynamic threshold and peak detection are accomplished as before described with the series of averager magnitude words some of which may now be substituted correlator magnitude words. By virtue of the foregoing, the averager process is not disturbed for purpose of subsequent sweeps but presence of any relatively strong signal is immediately detectable without reduced response time from the averaging process.

Preferably, the sample words from the FM discriminator are digitally low-pass or band pass filtered before being correlated so as to reduce sidelobes generated by the correlator. Further preferably, each complex correlator output word is low pass filtered and then decimated to produce fewer digital words to be averaged and evaluated by the peak detector, while preserving the information content of the received RF signals. To this end, the decimator word corresponding to a group of correlator words is utilized for purposes of the averaging process and/or correlator word substitution.

By virtue of the foregoing, there is thus provided a radar warning receiver which has increased sensitivity relative to prior art receivers, and in which the capture range is maximized in view of the signal and noise conditions existing at the time a signal is received. Consequently, the radar warning receiver of the present invention is adapted to alert operators of a vehicle to the presence of police radar surveillance with a desirably large reaction zone, while reducing the risk that a weak police radar signal will be overlooked or false alarms will occur too often and be annoying or irritating.

These and other objects and advantages of the present invention shall be made apparent from the accompanying drawings and the description thereof.

BRIEF DESCRIPTION OF THE DRAWING

The accompanying drawing, which is incorporated in and constitutes a part of this specification, illustrates a preferred embodiment of the invention and, together with a general description of the invention given above, and the detailed description of the preferred embodiment given below, serve to explain the principles of the invention.

The FIGURE is a block diagram of a radar warning receiver according to the principles of the present invention.

DETAILED DESCRIPTION OF THE DRAWING

With reference to the FIGURE, there is shown a block diagram of a radar warning receiver 5 according to the principles of the present invention. Pulsed or continuous signals occurring in the X-band or K-band are received by an antenna system 6 which includes horn antenna 8 coupled to first mixer 10 to which the signals received by horn antenna 8 are directed. Horn antenna 8 may include filters for preventing signals at unwanted frequencies from being passed to first mixer 10, and it may further include other filters for preventing outward radiation therefrom of internally generated radio frequency signals. Coupled to first mixer 10 is a variable frequency first local oscillator 12 adapted to be swept in frequency over a range of frequencies as described in aforementioned U.S. Pat. No. 4,313,216, the disclosure of which is incorporated herein by reference. First mixer 10 and first local oscillator 12 may be built into and made a part of antenna system 6 as provided in the ESCORT or PASSPORT radar warning receivers available from Cincinnati Microwave, Inc., the assignee herein, the latter as described in U.S. Pat. No. 4,613,989. The disclosure of said U.S. Pat. No. 4,613,989 is incorporated herein by reference. The oscillator disclosed in U.S. Pat. No. 4,583,057, also assigned to the assignee herein, may be utilized for local oscillator 12. The disclosure of said U.S. Pat. No. 4,583,057 is incorporated herein by reference.

The frequency of the oscillator signal generated by local oscillator 12 varies, i.e., it is swept, across a predetermined band of frequencies by a sweep generator 13 which causes the local oscillator signal to vary from a first frequency to a second frequency in a controlled manner in response to receipt of a sync pulse on sync out line 14. The varying frequency signal generated by local oscillator 12 is mixed with received signals from horn antenna 8 in first mixer 10 to generate first IF signals which are coupled to first IF amplifier 15. The output of amplifier 15 is coupled to a second mixer 16 whereat the first IF signals are mixed with a fixed frequency oscillator signal from second local oscillator 17 to produce second IF signals which are amplified by second IF amplifier 18. The frequency of oscillator 17 is selected so that during the sweep of oscillator 12, any received signal in the desired band(s) mixed with the signal from oscillator 12 will generate two IF signals, one being a primary and one being an image as is well understood. The output of amplifier 18 is coupled through bandpass filter 20 and limiting second IF amplifier 21 to frequency discriminator circuit 22. The output of discriminator 22 is coupled to low pass filter 23 which preferably has a corner frequency of less than 8 KHz and more preferably about 6 KHz. Operation of the foregoing is generally as described in aforesaid U.S. Pat. No. 4,313,216.

FM discriminator 22 is preferably part of an FM receiver IF 24 (such as an LM3089 available from National Semiconductor Corporation, Santa Clara, Calif.; or an NE604 available from Signetics Corporation, Sunnyvale, Calif.) and includes an AM detector 25 driven by the same IF output from amplifier 21 to produce another analog signal on output 26 corresponding to the strength of the signal received at the frequency to which receiver 5 is tuned at that time.

The output of low pass filter 23 is coupled to a first input of analog multiplexer 27. Similarly, the AM output 26 of IF 24 is coupled to a second input of analog multiplexer 27. In a first state of multiplexer 27, as determined by the state of select signal 28, filter 23 output is coupled to analog-to-digital (A/D) converter 29 whereas, in a second state of multiplexer 27, output 26 is coupled to A/D converter 29 for purposes to be described hereinafter. Low pass filter 23 also has gain in the pass band which is set such that: the noise level from frequency discriminator 22 is nearly full-scale into A/D converter 29. A/D converter 29 includes a sample hold storage buffer which stores the input signal in response to a clock A/D signal 30.

In the first state of multiplexer 27, A/D converter 29 produces a digital word corresponding to the level of the output from FM discriminator 22 at any given instant of time. As each sweep of oscillator 12 progresses, A/D converter 29 samples the FM discriminator output A/D at sample intervals as dictated by clock A/D pulse 30 to produce a series of digital sample words, each corresponding to the magnitude of RF energy received by antenna 8 at the frequency or frequencies to which receiver 5 is tuned by oscillator 12 at that interval.

Preferably, a sample rate of about 119 KHz is used to produce 14,535 digital sample words in each sweep, each sample word preferably comprised of six bits. As they are generated, sample words from the output of A/D converter 29 are sequentially coupled to DSP circuit 32, such as a DSP56000 or DSP96002 integrated circuit available from Motorola Semiconductors, Inc. DSP circuit 32 includes a control section 34 which causes the DSP circuit 32 to perform a series of programmed instructions stored in program memory 36 in sequence with pulses from system clock 38 by which to control timing and communication within DSP circuit 32, as is well understood. Control section 34 also causes generation of the pulse 14 to sweep generator 13 which initiates a sweep of local oscillator 12 such that operation of DSP circuit 32 is synchronized to the sweep. Control section 34 further causes generation of the appropriate select 28 followed by a conversion request (clock A/D 30) to converter 29 by which to determine the nature and timing of signals input to DSP circuit 32. DSP circuit 32 is programmed in accordance with the principles of the present invention to advantageously maximize the sensitivity of receiving under the signal and noise conditions prevailing at the time, as will now be described.

Each digital sample word generated at each sample interval is coupled to a software recursive infinite impulse response (IIR) low pass filter 40 to produce a filtered sample word for each sample word generated. Low pass IIR filter 40 has at least a second order s-domain low pass transfer function as follows:

$$H(s) = \frac{f_c^2}{s^2 + df_c s + f_c^2} \quad (1)$$

where d is the filter damping function (preferably equal to about 1.414214), and $f_c$ is the filter cutoff frequency (point at which the filter gain is equal to 1/d — preferably equal to about 350 Hz). Alternatively, filter 40 could be a band pass IIR filter having the transfer function:

$$H(s) = \frac{ds}{s^2 + df_c s + f_c^2} \quad (2)$$

The output of IIR filter 40 is coupled to complex correlator 42 which utilizes a Discrete Fourier Transform to correlate the current filtered sample word and the previous 127 filtered sample words with a series of complex or correlation function words representative of the response of FM discriminator 22 to provide improved signal-to-noise ratio, as is well understood. The preferred correlation function is $$e^{-j2\pi k/128} = \cos\left(\frac{2\pi k}{128}\right) - j\sin\left(\frac{2\pi k}{128}\right),$$

although other correlation functions may be used.

Correlator 42 preferably correlates the filtered sample words according to the formula (3):

$$H_{L+1}\left(\frac{1}{NT}\right) =$$

$$e^{+j2\pi L/N} \cdot H_L\left(\frac{1}{NT}\right) + h(LT) - h((L-N)T)$$

where N=128 points, L =point index, T = 1/sample rate (e.g., =1/119791), so as to produce on its output a complex correlator word as each new filtered sample word is input thereto. It will be appreciated that as each sweep first progresses, there will be fewer than 127 filtered sample words available for purposes of the correlation, i.e., there will be several missing words during the earliest portion of the sweep. As each sample interval occurs in the sweep, more of the missing words will be supplied, but until they are, they are assumed equal to zero.

To reduce the number of digital words to be dealt with by the remainder of DSP circuit 32, it is preferred to decimate the complex correlator words generated by correlator 42. To this end, the complex correlator words produced by correlator 42 are coupled to a complex IIR low pass filter 44 including a pair of IIR filters identical to IIR filter 40 (one for the real components and one for the imaginary components of the complex correlator words). The outputs of complex IIR low pass filter 44 are decimated by thirty-two in decimator 46 whereby to produce approximately 400 complex digital decimator words through the course of the sweep containing the pertinent contents of the data in the original 14,000 plus complex words. Preferably, the function of decimator 46 is provided merely by providing only every thirty-second complex word output of filter 44 to averager 48, whereby each decimator 46 output represents primarily the magnitude of RF signal energy within the group of 32 undecimated sample intervals (i.e., the frequency segment). The contribution of RF noise in each frequency segment is minimized as a result of correlator 42.

In accordance with the present invention, each sweep is broken into about 400 segments representing continuous segments of frequency within the RF band(s) of interest. In order to process the data as desired, it is helpful to assign to each such segment an index number. As each decimator word is generated for each index, averager 48 causes 10% of the decimator word value to be stored in a memory location associated with its respective index number in one page of a supplemental memory 50 exterior of DSP circuit 32 (and communicating over bidirectional bus 52 with averager 48, A/D converter 29 and peak detector 54), along with 90% of the value previously stored in that same location. The resulting accumulated or average value is a complex digital word referred to herein as an averager word. Thus, as the very first sweep progresses, the memory location for each index number will start with zero and thereafter a digital word having a value equal to 10% of the associated decimator word will be added to this location. Thereafter, in each sweep, the averager word in that memory location will be updated or accumulated by averager 48 as described above (10% new, 90% old), so as to increase in magnitude in response to received RF signals in that segment of frequency while tending to further minimize and even cancel contribution from RF noise in that segment whereby to improve signal-to-noise ratio and, hence, the sensitivity of receiver 5. Also as each complex averager word is determined, a value corresponding to the averager word is determined (e.g., by the sum of squares) to produce an associated series of real averager words. The averager magnitude words for each sample interval are also stored in memory locations associated with their respective index numbers, such as on a second page of memory 50.

After each sweep of oscillator 12 is concluded, the contents of supplemental memory 50 are evaluated by peak detector 54 to determine the dynamic threshold of that sweep as affected by all of the previous sweeps and to locate received signals in the sweep which may be indicative of a police radar signal at antenna 8. In this regard, peak detector 54 calculates a digital threshold word representing the mean square magnitude of the averager words stored in averager 48 in supplemental memory 50 by summing the real components (magnitude squared) in all of the associated averager magnitude word memory locations, dividing the sum by the number of memory locations involved, and multiplying by a constant K. The constant K is determined empirically based upon a tradeoff between sensitivity and false alarm rate and is equal to 14 in a preferred embodiment.

Peak detector 54 further examines the magnitude squared in each of the above-described second page of memory locations of supplemental memory 50 to determine whether the magnitude of the averager word for any segment exceeds the dynamic threshold. Theoretically, whenever the magnitude squared (real component) of any word in the averager exceeds the dynamic threshold, a police radar signal may have been received. Accordingly, if any such segment meets the above criteria, an alarm enable signal may be output from DSP circuit as at 56 to remaining circuitry 58 to generate audible and/or visually perceptible alarms as desired to alert an operator of the vehicle (not shown) to the presence of police radar surveillance.

Selection of the threshold as described above by which signals may be accepted as indicating receipt of a police radar signal greatly reduces falsing problems possible with prior art approaches and generally allows the lowest possible threshold setting (and consequently, the best possible sensitivity) under the signal and noise conditions then-existing. Under conditions in which a multitude of signals appear, the dynamic threshold might actually exceed the value of each of the averager words. To minimize the risk of missing a police radar signal under those conditions, peak detector 54 is further programmed to constrain the dynamic threshold within limits such that if the calculated dynamic threshold exceeds a predetermined maximum (e.g., 0.012207 or −19.13 dB relative to full scale), it is set equal to that maximum. Similarly, in situations where there are very few signals, the threshold may go so low as to allow noise alone to cause an averager word to exceed the threshold. To this end, if the threshold is below a predetermined minimum, it is set equal to that minimum to minimize false alarms under such conditions. The predetermined minimum may be in the range of 0.000732 to 0.002197 (−31.35 dB to −26.58 dB relative to full scale) and is preferably selected as low as possible in that range without creating a problem with false alarms.

Due to the averaging process, it is possible that relatively strong police radar signals may not generate sufficient contribution to the averaging process to drive the averager magnitude above the dynamic threshold as quickly as would be desired, i.e., response time to relatively strong police radar signals may be too long. The transient response is thus delayed by the averaging process suggesting that a different ratio of old to new should be used in the averager. That is, more than 10% of the new would be added to less than 90% of the old. However, the signal to noise of the averaging process is adversely affected by increasing the contribution of new sweep values. Thus, rather than increase the contribution of new correlator words, it is preferred to reduce same.

A solution to the transient response problem brought about by the averaging process is provided by substituting for selected averager magnitude words, the magnitude of the decimator words under certain circumstances. To this end, after the complex averager word is determined, but before its magnitude is determined, a test is conducted of the decimator output word then-involved. It has been found that if the magnitude of that decimator word exceeds a predetermined minimum threshold, use of the unaveraged magnitude for that sample interval rather than the averaged magnitude in determining dynamic threshold and undertaking peak detection greatly improves transient response while also taking advantage of the increased sensitivity otherwise provided by the dynamic threshold process as above-described. Thus, in any sample interval where the magnitude of the decimator word exceeds a predetermined minimum threshold, the decimator magnitude word is substituted for the averager magnitude word for that sample interval. Thereafter, the dynamic threshold is determined from the series of averager magnitude words as previously described, but possibly including substituted decimator magnitude words for some of the words in that series. Decimator 46 may be eliminated and all of the correlator words utilized for averaging or substitution, as appropriate, if sufficient memory capacity is provided. In that event, the above-described averaging and substitution processes occur based upon the correlator word for each sample interval rather than the decimator word for each group of sample intervals. As used hereinafter, "averager word" refers either to the averager magnitude word or the substituted correlator or decimator magnitude word, as appropriate.

Even with substitution, the dynamic threshold is still substantially affected by all previous sweeps, as previously described, as the contribution of the substituted correlator or decimator magnitude words to the dynamic threshold is generally not substantial. On the other hand, peak detection is directly impacted and will produce a positive response without delay from the averaging process for signals strong enough to obviate the need for averaging to "pull" the signal out of the noise. In a preferred embodiment, the predetermined minimum threshold for the above-purpose is selected on ten times the minimum limit for dynamic threshold. Additionally, and advantageously, with the improved transient response thus brought about, it is possible to improve signal-to-noise of the averager process by changing the averager ratio from 90:10 to 95:5 to overcome that problem while taking advantage of the benefits of the system as above-described.

Preferably, and to avoid the possibility of false alarms due, for example, to interference from variable frequency signal sources such as superhomodyne radar warning receivers operating in the vicinity of receiver 5, DSP circuit 32 includes an index memory 50 which operates in conjunction with peak detector 54 to provide sweep-to-sweep comparison for false alarm elimination in a fashion similar to that provided by the circuit shown in U.S. Pat. No. 4,581,769 assigned to the assignee hereof. Aforesaid U.S. Pat. No. 4,581,769 is incorporated herein by reference.

Rather than provide the alarm enable signal merely because one or more averager words exceed the threshold, it is preferred to not generate the alarm enable signal until a match is found in index numbers exceeding the dynamic threshold in two consecutive sweeps, for example. To this end, after a given sweep, the index numbers of those segments whose averager word exceeded the dynamic threshold may be stored in memory 60. Thereafter, on the next sweep, the index number of each segment exceeding the newly-calculated dynamic threshold may be compared to the index numbers stored in memory 60. A match between any such index number from the present sweep and a stored index number from the prior sweep provides confirmation that an actual police radar signal was likely received and the alarm enable signal may be placed on output 56 as previously described.

To allow for variations due to instabilities in receiver 5 and the like, DSP circuit 32 is programmed to allow some margin in comparing segments from sweep to sweep. For example, if segment number 6 in sweep A had a value which exceeded the dynamic threshold for sweep A, and in sweep B it was segment 7 which exceeded the dynamic threshold calculated from sweep B, an alarm would still be given. Thus, the sweep-to-sweep segment comparisons allow for some mismatch to still be deemed a valid signal. The amount of mismatch is preferably plus or minus 5 segments. After the sweep-to-sweep comparison, the index numbers of the averager words exceeding the threshold in the present sweep may be stored in memory 56 in place of the previously stored index numbers.

Due to limitations in the amount of memory available in memory 56, as well as the amount of time available to do all of the calculations, it may be possible to maintain no more than a few of the index numbers of segments from a given sweep for comparison to the results of the next sweep. It is believed that storing no more than six index numbers of those segments having magnitudes exceeding the dynamic threshold is sufficient to provide satisfactory operation of receiver 5. Thus, if seven such segments satisfy the criteria, the index numbers for only the six largest averager words (those which exceed the dynamic threshold by the most) will be stored for use in the subsequent sweep, whereas if fewer than six test positive, only the index numbers for those fewer number of segments will be stored. Alternatively, it has been found that the validity of the comparison is not hampered if the index numbers of the six segments having the largest magnitude irrespective of whether they exceed the dynamic threshold are stored from a first sweep for comparison to the results of a second sweep. In this regard, if the index numbers for any segment in the present sweep exceeding the dynamic threshold match a stored index number (within the above-described tolerance), even though that same segment did not exceed the threshold in the prior sweep, a match is found and an alarm enable provided.

Because police radar operates in more than one band, it is desirable to know the band in which the signal is received. Thus, for example, it is useful to know whether the police radar unit emitting received signal is operating in the X-band or the K-band. To this end, assuming that the sweep-to-sweep comparison is positive, peak detector 54 evaluates the spacing between those segments (up to six) which have a magnitude exceeding the dynamic threshold in that sweep to determine whether the alarm enable should indicate X- or K-band. As a result of generation of an image signal when the local oscillator is swept, at least one pair of averager words having a predetermined difference in index numbers should be produced having magnitudes exceeding the dynamic threshold for each signal received. The index numbers for all of the six or fewer segments which are retained after the current sweep are investigated for their spacing. The index numbers are paired and, if it is possible to pair them up such that the index numbers in each pair are spaced apart approximately 37 ($\pm 7$) segments, then the alarm enable signal will indicate that a K-band alarm is to be given. If, however, two of the segments in any pair are separated by approximately 75 ($\pm 13$) segments, the above-pairing for K-band is not possible, or only one segment exceeds threshold, then the alarm enable signal will indicate that an X-band alarm is to be given.

A further aspect of the present invention provides an alarm enable (preferably for an X-band alarm) whenever there are no averager words which exceed the dynamic threshold in the event that one or two of the same averager words otherwise present the largest magnitude for an extended period of time, such as two seconds. For this purpose, in any sweep where no index numbers are selected which match any index number stored in memory 60 from the prior sweep as described above, a counter 62 and an integrator 63 are reset by peak detector 54. Also, the index number of the two averager words having the largest magnitude (irrespective of their relationship to the threshold) are stored in low signal store or memory 64. For each sweep thereafter, if no matches occur between the index numbers selected in that sweep and the index numbers stored in memory 60 from the prior sweep as described earlier, counter 62 is either incremented or reset and integrator 63 is either updated or reset. The counter is incremented if, in that sweep, the index number of either of the two averager words with the largest magnitude in that sweep match one of the two index numbers stored in memory 64 when counter 62 was last reset. Similarly, the value in the integrator 63 is summed with the largest averager word from that sweep. If, as a result of such operation over a plurality of sweeps, integrator 63 sums up to a predetermined value (e.g., exceeding ten times the minimum dynamic threshold limit) and counter 62 counts up to a predetermined number (corresponding to about two seconds worth of sweeps) without resetting, peak detector 54 will provide an alarm enable irrespective of whether the two averager words involved are above or below the dynamic threshold. If, in any sweep, no match occurs from either of memory 60 or memory 64, counter 62 and integrator 63 are again reset and two new index numbers will be stored in memory 64 based on the results of that sweep.

As is well understood, remaining circuitry 56 of receiver 5 may provide an audible alarm (not shown) which beeps at a rate proportional to the strength of a received signal when alarm enable 56 is provided. Similarly, an LED bar graph (not shown) functioning as a signal strength meter may be employed to show visually that same signal strength. To this end, at each sample interval, analog multiplexer 27 is caused to switch between the first and second state by select signal 28 so as to provide at each sample interval (1) a digital sample word from FM discriminator 22 to be processed as previously described, and (2) a digital AM word which is routed to and stored in a secondary memory location in supplemental memory 50 corresponding to the sample interval. In conjunction with provision of an alarm enable 56 (resulting from a positive sweep-to-sweep match, for example), the digital AM word stored in supplemental memory 50 at a location corresponding to the index number of the largest averager word in that sweep is routed through peak detector 54 to remaining circuitry 58 over AM line 66. That AM word corresponds to the amplitude of the signal received in that sample interval and, thus, may be utilized to control the beep rate of the audible alarm and/or the LED bar graph display. Although not shown, output 26 of AM detector 26 may be amplified such that the LED bar graph just barely begins to display intensity at full signal when receiver 5 is exposed to a calibrated police radar signal reference.

While the present invention has been illustrated by the description of an embodiment thereof, and while the embodiment has been described in considerable detail, it is not the intention of applicant to restrict or in any way limit the scope of the appended claims to such detail.

Additional advantages and modifications will readily appear to those skilled in the art. For example, if the memory and calculation capacity of the DSP circuit utilized is sufficient, it may be possible to dispense with complex IIR filter 44 and decimator 46 and, thus, provide sufficient memory locations in supplemental memory 50 to accumulate all the correlator output words produced by correlator 42 for purposes of operation of peak detector 54 as described above. Indeed, IIR filters 40 and 44 could alternatively be finite impulse response filters. The invention in its broader aspects is therefore not limited to the specific details, representative apparatus and method, in the illustrative example shown and described. Accordingly, departures may be made from such details without departing from the spirit or scope of applicant's general inventive concept.

What is claimed is:

1. A police radar warning receiver comprising:
   IF signal means for producing an IF sweep pattern as an oscillator signal is swept in frequency between a first frequency and a second frequency in response to mixing of received RF signals in at least one band of police radar signal frequencies with said swept oscillator signal;
   FM discriminator means responsive to said IF signal means for producing an FM sweep pattern corresponding to FM demodulation of said IF sweep pattern as said IF sweep pattern is produced;
   sampler means for repeatedly sampling at sample intervals said FM sweep pattern as it is produced whereby to produce a series of digital sample words each associated with a respective sample interval;
   correlator means for correlating each digital sample word as it is produced with a plurality of proceeding said digital sample words and a complex correlator function whereby to provide a series of complex digital correlator words each associated with a respective sample interval;
   averager means for accumulating for each of at least a plurality of said sample intervals, an average of the complex digital correlator word produced each sweep and associated with a said sample interval over a plurality of sweeps of the oscillator signal whereby to produce a series of averager words each associated with a respective one of said plurality of sample intervals;
   substitution means for replacing in said series of averager words an averager word associated with a selected sample interval with a substitute averager word corresponding to the correlator word from that sample interval;
   threshold means for providing after a given sweep of the oscillator signal a dynamic threshold word corresponding to the magnitude of said series of averager words; and
   peak detector means for providing an alarm enable after said given sweep if an averager word has a magnitude greater than said dynamic threshold word whereby to indicate receipt of a police radar signal.

2. The police radar warning receiver of claim 1 further comprising digital filter means between said sampler means and said correlator means whereby to filter each said digital sample word before it is correlated by said correlator means.

3. The police radar warning receiver of claim 2, said digital filter means being a low pass filter.

4. The police radar warning receiver of claim 2, said digital filter means being a band pass filter.

5. The police radar warning receiver of claim 2, said digital filter means being at least a second order recursive infinite impulse response filter.

6. The police radar warning receiver of claim 1 including means for storing a first set of index numbers associated with a plurality of the averager words meeting predetermined criteria after a first sweep of the oscillator signal, means for obtaining a second set of index numbers associated with a plurality of the averager words having a magnitude greater than said dynamic threshold after a second sweep of the oscillator signal, and means for permitting provision of said alarm enable whenever the second set of index numbers corresponds in a predetermined manner to the first set of index numbers whereby to reduce likelihood of false alarms.

7. A police radar warning receiver comprising:
   IF signal means for producing an IF sweep pattern as an oscillator signal is swept in frequency between a first frequency and a second frequency in response to mixing of received RF signals in at least one band of police radar signal frequencies with said swept oscillator signal;
   FM discriminator means responsive to said IF signal means for producing an FM sweep pattern corresponding to FM demodulation of said IF sweep pattern as said IF sweep pattern is produced;
   sampler means for repeatedly sampling at sample intervals said FM sweep pattern as it is produced whereby to produce a series of digital sample words each associated with a respective sample interval;
   correlator means for correlating each digital sample word as it is produced with a plurality of proceeding said digital sample words and a complex correlator function whereby to provide a series of complex digital correlator words each associated with a respective sample interval;
   digital filter means responsive to said correlator means to produce a filtered complex correlator word for each complex correlator word;
   decimator means responsive to said digital filter means for decimating said filter complex correlator words to produce a series of decimator words, each said decimator word associated with a group of said sample intervals;
   averager means for accumulating for each of at least a plurality of said sample interval groups an average of the decimator word produced each sweep and associated with a said sample interval group of a plurality of sweeps of the oscillator signal whereby to produce a series of averager words each associated with a respective one of said plurality of sample interval groups;
   substitution means for replacing in said series of averager words an averager word associated with a selected group of sample intervals with a substitute averager word corresponding to the decimator word from that group of sample intervals.
   threshold means responsive to said averager means for providing after a given sweep of the oscillator signal a dynamic threshold word corresponding to the magnitude of said series of averager words; and
   peak detector means for providing an alarm enable after said given sweep if an averager word has a magnitude greater than said dynamic threshold word whereby to indicate receipt of a police radar signal.

8. The police radar warning receiver of claim 7, said digital filter means being a low pass filter.

9. The police radar warning receiver of claim 7, said digital filter means being at least a second order recursive infinite impulse response filter.

10. The police radar warning receiver of claim 7, further comprising second digital filter means between said sampler means and said correlator means whereby to filter each said digital sample word before it is correlated by said correlator means.

11. The police radar warning receiver of claim 10, said second digital filter means being a low pass filter.

12. The police radar warning receiver of claim 10, said second digital filter means being a band pass filter.

13. The police radar waring receiver of claim 10, said second digital filter means being at least a second order recursive infinite impulse response filter.

14. The police radar warning receiver of claim 7 including means for storing a first set of index numbers associated with a plurality of the averager words meeting predetermined criteria after a first sweep of the oscillator signal, means for obtaining a second set of index numbers associated with a plurality of the averager words having a magnitude greater than said dynamic threshold after a second sweep of the oscillator signal, and means for permitting provision of said alarm enable whenever the second set of index numbers corresponds in a predetermined manner to the first set of index numbers whereby to reduce likelihood of false alarms.

15. A method of detecting a police radar signal comprising:
repeatedly sweeping an oscillator between a first frequency and a second frequency;
producing an IF signal pattern by mixing received RF signals in at least one band of police radar signal frequencies with said sweeping oscillator signal;
producing an FM sweep pattern corresponding to FM demodulation of said IF sweep pattern as said IF sweep pattern is produced;
repeatedly sampling at sample intervals said FM sweep patterns as it is produced whereby to produce a series of digital sample words each associated with a respective sample interval;
correlating each digital sample word as it is produced with a plurality of preceding same digital sample words in a complex correlation function whereby to provide a series of complex digital correlator words each associated with a respective sample interval;
accumulating for each of at least a plurality of said sample intervals, an average of the complex digital correlator word produced each sweep associated with a said sample interval over a plurality of sweeps of the oscillator signal whereby to produce a series of complex averager words each associated with a respective one of said plurality of sample intervals;
substituting in said series of averager words an averager word associated with a selected sample interval with a substitute averager word corresponding to the correlator word from that sample interval.
providing, after a given sweep of the oscillator signal, a dynamic threshold word corresponding to the magnitude of said series of averager words; and
providing an alarm enable after said given sweep if an averager word has a magnitude greater than said dynamic threshold word whereby to indicate receipt of a police radar signal.

16. The method of claim 15 further comprising digitally filtering each said digital sample word before it is correlated.

17. The method of claim 15 further comprising storing a first index number associated with a plurality of the averager words meeting predetermined criteria after a first sweep of the oscillator signal, obtaining a second set of index numbers associated with a plurality of the averager words having a real component greater than the dynamic threshold after a second sweep of the oscillator signal, and permitting provision of said alarm enable whenever the second set of index numbers correspond in a predetermined manner to the first set of index numbers whereby to reduce likelihood of false alarms.

18. A method of detecting a police radar signal comprising:
repeatedly sweeping an oscillator between a first frequency and a second frequency;
producing an IF signal pattern by mixing received RF signals in at least one band of police radar signal frequencies with said sweeping oscillator signal;
producing an FM sweep pattern corresponding to FM demodulation of said IF sweep pattern as said IF sweep pattern is produced;
repeatedly sampling at sample intervals said FM sweep patterns as it is produced whereby to produce a series of digital sample words each associated with a respective sample interval;
correlating each digital sample word as it is produced with a plurality of preceding same digital sample words in a complex correlation function whereby to provide a series of complex digital correlator words each associated with a respective sample interval;
producing a filter complex correlator word for each complex correlator;
decimating said filter complex correlator words to produce a series of decimator words, each said decimator word associated with a group of said sample intervals;
accumulating for each of at least a plurality of said sample interval groups an average of the decimator word produced each sweep and associated with a said sample interval group over a plurality of sweeps of the oscillator signal whereby to produce a series of complex averager words each associated with a respective one of said plurality of sample interval groups;
substituting in said series of averager words an averager word associated with a selected group of sample intervals with a substitute averager word corresponding to the decimator word from that group of sample intervals.
providing, after a given sweep of the oscillator signal, a dynamic threshold word corresponding to the magnitude of said series of averager words; and
providing an alarm enable after said given sweep if an averager word has a magnitude greater than said dynamic threshold word whereby to indicate receipt of a police radar signal.

19. The method of claim 18 further comprising digitally filtering each said digital sample word before it is correlated.

20. The method of claim 18 further comprising storing a first index number associated with a plurality of the averager words meeting predetermined criteria after a first sweep of the oscillator signal, obtaining a second set of index numbers associated with a plurality of the averager words having a real component greater than the dynamic threshold after a second sweep of the oscillator signal, and permitting provision of said alarm enable whenever the second set of index numbers correspond in a predetermined manner to the first set of index numbers whereby to reduce likelihood of false alarms.

* * * * *

UNITED STATES PATENT AND TRADEMARK OFFICE
CERTIFICATE OF CORRECTION

PATENT NO. : 4,954,828                        Page 1 of 2

DATED : September 4, 1990

INVENTOR(S) : Steven K. Orr

It is certified that error appears in the above-identified patent and that said Letters Patent is hereby corrected as shown below:

On the title page, listed under Other Publications, "Weinsatein, Clifford J." should be -- Weinstein, Clifford J. --.

Col. 6, line 36, after "that" delete -- : --.

Col. 6, line 41, after "converter" delete -- . --.

Col. 8, line 25, should not start a new paragraph after "one".

Col. 14, line 42, "filtered" should be -- filter --.

Col. 14, line 61, "." should be -- ; --.

Col. 15, line 45, "patterns" should be -- pattern --.

Col. 15, line 49, "same" should be -- said --.

Col. 15, line 50, "in" should be -- and --.

Col. 15, line 65, "." should be -- ; --.

Col. 16, line 9, "index number" should be -- set of index numbers --.

Col. 16, line 31, "patterns" should be -- pattern --.

UNITED STATES PATENT AND TRADEMARK OFFICE
CERTIFICATE OF CORRECTION

PATENT NO. : 4,954,828

DATED : September 4, 1990

INVENTOR(S) : Steven K. Orr

It is certified that error appears in the above-identified patent and that said Letters Patent is hereby corrected as shown below:

Col. 16, line 35, "same" should be -- said --.

Col. 16, line 36, "in" should be -- and --.

Col. 16, line 41, "correlator" should be -- digital correlator word --.

Col. 16, line 58, "." should be -- ; --.

Col. 17, line 2, "index number" should be -- set of index numbers --.

Signed and Sealed this

Twenty-eighth Day of April, 1992

Attest:

HARRY F. MANBECK, JR.

*Attesting Officer*     *Commissioner of Patents and Trademarks*